(12) United States Patent
Kamboj et al.

(10) Patent No.: US 9,703,594 B1
(45) Date of Patent: Jul. 11, 2017

(54) PROCESSING OF LONG RUNNING PROCESSES

(71) Applicant: Amazon Technologies, Inc., Seattle, WA (US)

(72) Inventors: Ankit Kamboj, Seattle, WA (US); Xing Wu, Redmond, WA (US); George Steven McPherson, Seattle, WA (US); Jian Fang, Seattle, WA (US); Dag Stockstad, Dublin (IE); Abhishek Rajnikant Sinha, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 14/635,254

(22) Filed: Mar. 2, 2015

(51) Int. Cl.
*G06F 9/46* (2006.01)
*G06F 9/48* (2006.01)

(52) U.S. Cl.
CPC .......... *G06F 9/4806* (2013.01); *G06F 9/4881* (2013.01); *G06F 9/4887* (2013.01)

(58) Field of Classification Search
CPC ..... G06F 9/4881; G06F 9/4887; G06F 9/4806
See application file for complete search history.

(56) References Cited

U.S. PATENT DOCUMENTS

| | | | | |
|---|---|---|---|---|
| 6,389,473 | B1* | 5/2002 | Carmel | H04L 29/06 709/231 |
| 7,088,673 | B2* | 8/2006 | Horne | H04J 13/004 370/209 |
| 2002/0194325 | A1* | 12/2002 | Chmaytelli | H04L 67/325 709/224 |
| 2014/0350708 | A1* | 11/2014 | Kobayashi | G06Q 10/06 700/108 |
| 2015/0212655 | A1* | 7/2015 | Koski | G06F 17/30902 715/730 |

* cited by examiner

*Primary Examiner* — Camquy Truong
(74) *Attorney, Agent, or Firm* — Baker & Hostetler LLP

(57) ABSTRACT

A system adapted to process long-running processes is disclosed. A request to upload data is received at a server. The server divides the data into multiple parts and launches a separate process to upload each of the divided parts. The server records for each process the processing time or duration that the particular process used to upload its corresponding data item. The server maintains an average processing duration that is calculated from the processing durations of the completed processes. The server identifies that one process is continuing to run and compares a processing duration for the particular process to a threshold derived from the average processing duration. If the processing duration for the particular process exceeds the threshold, the server initiates a new process to upload the same data item. When one of either the new process or the still running process has completed processing, the server terminates the other process.

20 Claims, 5 Drawing Sheets

PROCESSING OF LONG RUNNING PROCESSES

BACKGROUND

Organizations have come to rely upon Web services to perform all manner of business-related computing functions. Web services allow organizations to harness nearly unlimited computing resources on an as-needed basis. Organizations may apply the processing capabilities provided by a Web service to computational projects of all sizes, from the small to the very large. An organization may have access to practically limitless storage capacity via services accessible via the Web.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
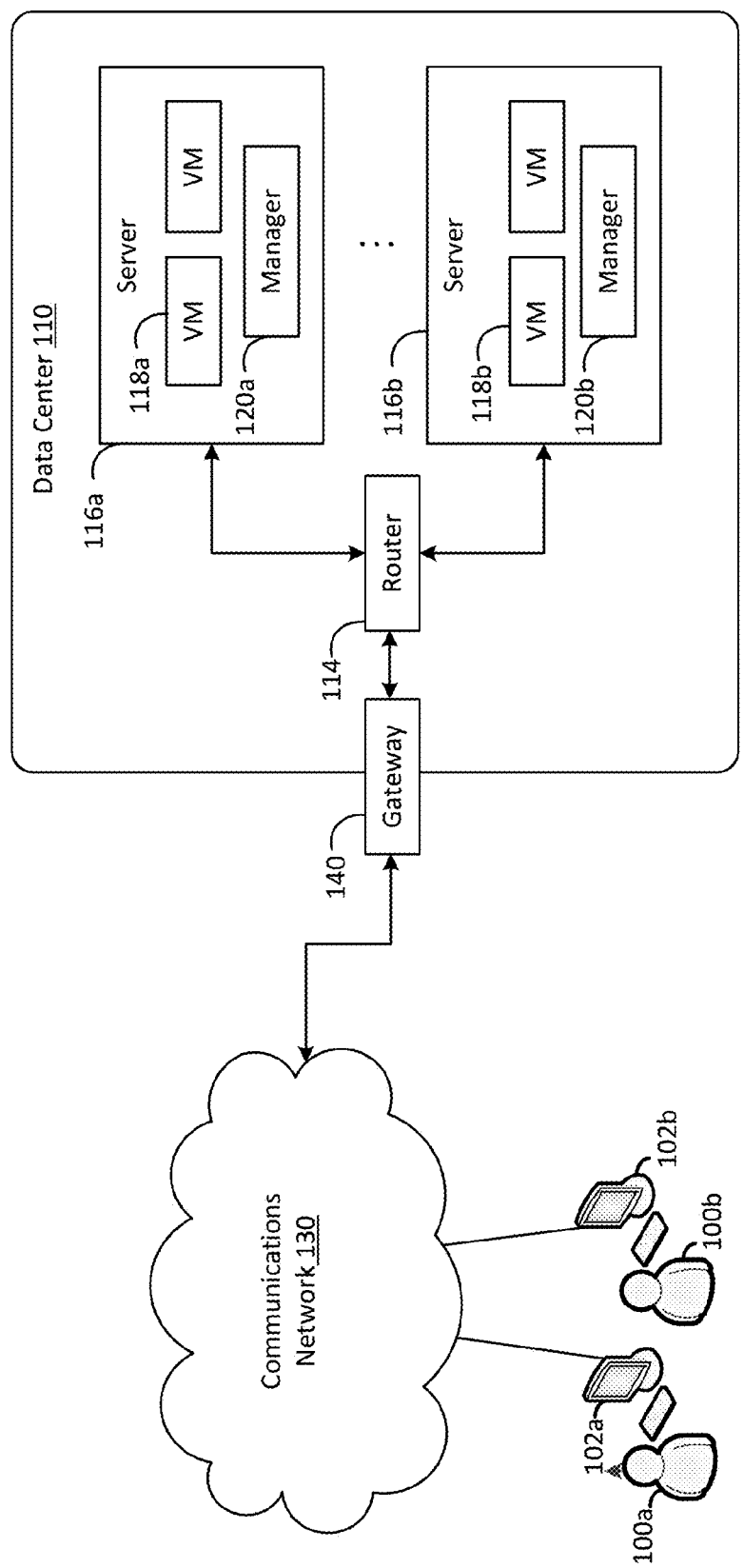
FIG. 1 depicts an example operating environment.

The widespread acceptance of Web services has resulted in raised user expectations. Users not only expect that the service will be completed as requested, but also that the services will be provided in a timely, efficient, and consistent manner.

From the perspective of the provider of Web services, delays in processing are very rare. However, they do occasionally happen. For example, unexpected processing delays have been known to occur in connection with processing techniques wherein an initial service request is divided into subparts and separate computing processes initiated to operate on each of the subparts. In an example scenario, a request may be received at a Web service to upload a large data item to a storage location. The Web service may process such a request by, for example, dividing the data item into parts and initiating separate processes to upload each of the individual parts. The processing of the request is not complete until each of the separate processes that were initiated to upload a portion of the original data item have completed processing. Accordingly, when one of the processes directed at uploading a portion of the data item takes a long time duration to complete, that one process delays the larger process from completing.

Applicants disclose herein systems and methods for detecting a long running process and initiating a new process, running in parallel to the still running long-running process, to perform the task originally undertaken by the long running process. The disclosed systems reduce or minimize the delay in performing the particular task, and allow other processes that rely upon the task to be completed in a more expeditious manner.

In an example embodiment, a request to perform a particular function is received at a computing server. The request may have been received at a Web service and the computing server may be one of many that handles requests received at the service. In an example scenario, the request may be to upload a data item such as, for example, a file.

The server, which may be referred to as the master server, divides the required processing into component parts. In the example scenario wherein the received request is to upload a data item, the master server divides the data item into parts. In an example embodiment, the master server may divide the data into equal parts.

The master server initiates a separate process or thread to perform the processing for each of the divided parts. In the example scenario where received request is to upload a data item and that item has been divided into data parts, the master server initiates or starts a separate process to upload each of the data parts. For example, where the received data item was divided into four parts, the master server may initiate four processes, one each for uploading the four parts of the original data item. The master server records the start or initiation time for each process.

The master server monitors for the completion of the processes or threads that were initiated. As the processes complete performing their processing, e.g., complete uploading the data part, the master server records the time of completion. For each completed process, the master server uses the time of initiation of the process and the time of the completion of the process to calculate a duration or the time that it took the particular process to complete the upload. Additionally, the master server maintains an average time duration for completion of the processes that were initiated. Accordingly, as the master server-initiated processes complete processing, the master server calculates the duration of the processing for each completed process and updates the average duration to reflect the newly completed process.

The master server determines whether or not the number of executing processes that have completed processing meets or exceeds a first or preliminary threshold. For example, the preliminary threshold may be defined as a value representing half, i.e., 50 percent, of the processes that were initiated as part of the processing. The master server compares the number of completed processes or a number representing a percentage of all processes that have completed processing to the threshold to determine whether or not the preliminary or first threshold has been met. In the example scenario wherein the preliminary threshold has been set to fifty percent and two of an original four processes have completed uploading, the master server may determine that the threshold has been met. When the first or preliminary threshold has been met, the master sever calculates a processing duration for each of the still-processing processes and compares the calculated processing duration for each process to a second threshold value. In an example embodiment, the second threshold is a multiple of the average completion time of the completed processes, where the multiple may vary depending upon the number of or percentage of the processes that have completed processing. The multiple, and therefore the second threshold, decreases as the number of completed processes increases. In an example scenario, where fifty percent of the original processes have completed processing, the multiple may be 1.5 and the threshold is set as 1.5 times the average completion time. Where sixty percent of the original processes have completed processing, the multiple may be 1.4 and the threshold may be set as 1.4 times the average completion time. For each still-processing process, if the processing duration does not exceed the second threshold, the master server continues monitoring the progress of the particular process. But if the processing duration for the particular process exceeds the second threshold, the master server initiates a new process to perform the same processing that the identified process was originally invoked to perform. In the example scenario wherein the original process was initiated to upload a particular data item part, the newly initiated process is likewise initiated to upload the same data item part. The newly initiated process executes in parallel to the original process with both processes attempting to upload the particular data part.

The master server continues to monitor the status of the still-processing processes and also monitors the status of the corresponding newly initiated processes. For each still-processing process, upon the master server determining one of either the newly initiated process or the identified original process has completed its processing, e.g., uploading a data part, the master server terminates the processing of the other process, or processes where multiple processes had been spawned. For example, if the master server determines that a newly initiated process has completed processing, the master server terminates the original process and any additional processes that may have been initiated and correspond to the particular original process. Likewise, if the master server determines that the original process has completed processing, the master server terminates the newly initiated process. In all events, when processing for a data item is complete, such as, for example, when uploading of a data item has been completed successfully, either by the original process or a newly initiated process, the master server notifies any processing that may be dependent upon the completion of processing for the particular data item.

The master server continues any processing attendant to fulfilling the original request. For example, the master server may communicate an acknowledgement that the requested service has been completed. In the example scenario wherein the original request was to upload a date item, the master server may communicate an indication that the data item has been uploaded to the desired service or location.

Example Processing Environment

FIG. 1 illustrates an example computing environment in which stalled or long running processes may be identified and new processes initiated. FIG. 1 is a diagram schematically illustrating an example of a data center 110 that can provide computing resources to users 100a and 100b (which may be referred herein singularly as "a user 100" or in the plural as "the users 100") via user computers 102a and 102b (which may be referred herein singularly as "a computer 102" or in the plural as "the computers 102") via a communications network 130. Data center 110 may be configured to provide computing resources for executing applications on a permanent or an as-needed basis. The computing resources provided by data center 110 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including email servers, web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 110 may include servers 116a and 116b (which may be referred herein singularly as "a server 116" or in the plural as "the servers 116") that provide computing resources available as virtual machine instances 118a and 118b (which may be referred herein singularly as "a virtual machine instance 118" or in the plural as "the virtual machine instances 118"). The virtual machine instances 118 may be configured to execute applications, including Web servers, application servers, media servers, database servers, and the like. Other resources that may be provided include data storage resources and may include file storage devices, block storage devices, and the like. In an example embodiment, data storage resources may be a Web service storage solution such as, for example, Amazon S3.

The availability of virtualization technologies for computing hardware has provided benefits for providing large scale computing resources for customers and allowing computing resources to be efficiently and securely shared between multiple customers. For example, virtualization technologies, such as those provided by VMware or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 1, communications network 130 may, for example, be a publicly accessible network of linked networks and possibly operated by various distinct parties, such as the Internet. In other embodiments, communications network 130 may be a private network, such as, for example, a corporate or university network that is wholly or partially inaccessible to non-privileged users. In still other embodiments, communications network 130 may include one or more private networks with access to and/or from the Internet.

Communications network 130 may provide computers 102 with access to the resources provided by data center 110. Computers 102 may be computers utilized by customers 100 or other customers of data center 110. For instance, user computer 102a or 102b may be a server, a desktop or laptop personal computer, a tablet computer, a wireless telephone, a personal digital assistant (PDA), an e-book reader, a game console, a set-top box, or any other computing device capable of accessing data center 110. User computer 102a or 102b may connect directly to the Internet (e.g., via a cable modem or a Digital Subscriber Line (DSL)). Although only two user computers 102a and 102b are depicted, it should be appreciated that there may be multiple user computers.

Computers 102 may also be utilized to configure aspects of the computing resources provided by data center 110. In this regard, data center 110 might provide a Web interface through which aspects of its operation may be configured through the use of a Web browser application program executing on user computer 102. Alternatively, a stand-alone application program executing on user computer 102 might access an application programming interface (API) exposed by data center 110 for performing the configuration operations. Other mechanisms for configuring the operation of the data center 110, including deploying updates to an application, might also be utilized.

Servers 116a and 116b (which may be referred herein singularly as "a server 116" or in the plural as "the servers 116") shown in FIG. 1 may be standard servers configured appropriately for providing the computing resources described herein and may provide computing resources for executing one or more applications. In one embodiment, the computing resources may be virtual machine instances 118. In the example of virtual machine instances, each of the servers 116 may be configured to execute an instance manager 120a or 120b (which may be referred herein singularly as "an instance manager 120" or in the plural as "the instance managers 120") capable of executing the virtual machine instances. The instance managers 120 may be a virtual machine monitor (VMM) or another type of program configured to enable the execution of virtual machine instances 118 on servers 16, for example. As discussed above, each of the virtual machine instances 118 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 110 shown in FIG. 1, a router 114 may be utilized to interconnect the servers 116a and 116b. Router 114 may also be connected to gateway 140, which is connected to communications network 130. Router 14 may manage communications within networks in data center 110, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 110 described in FIG. 1 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 110 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 810 can be scaled on-demand.

Auto scaling is one mechanism for scaling computing resources in response to increases or lulls in demand for the resources. Auto scaling allows customers of data center 110 to configure data center 110 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 110.

Data center 110 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Example Processing of Long-Running Processes

Figure 2:
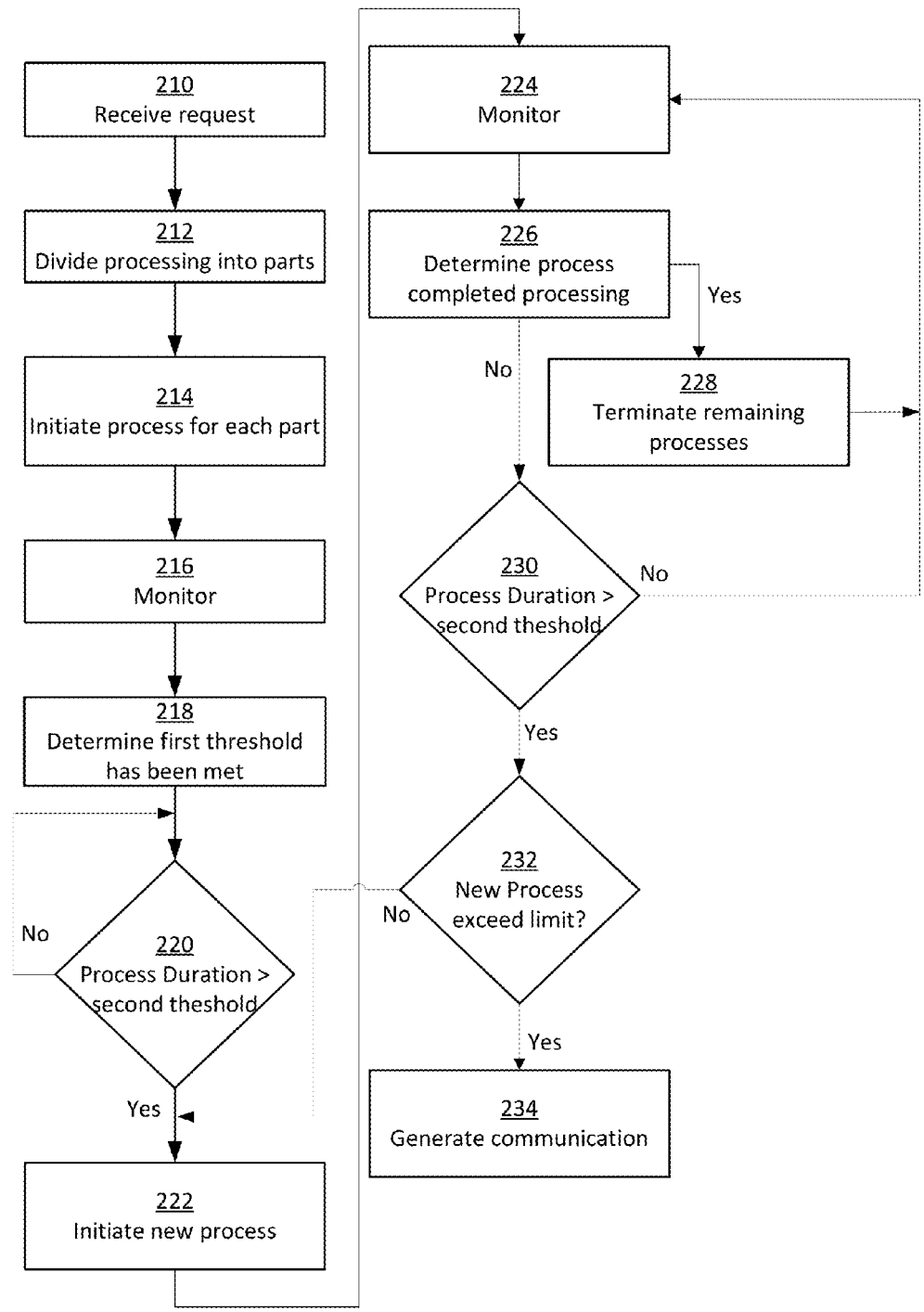
FIG. 2 depicts a flow diagram of an example process for handling long-running processes.

FIG. 2 is a diagram depicting example processing performed by server 116a, which may be referred to as master server 116a, to identify long running processes and initiate new processes, running in parallel to the still running long-running process, to perform the processing originally undertaken by the long running process. As shown, at block 210, a request to perform a particular function is received at master server 116a. The request may be received, for example, via network 130 and originate from a user 100a operating computing system 102a. The request may be to perform any of numerous different processing services that may be provided by a Web based service. For example, the request may be to perform a series of calculations on a particular data set. In another example scenario, the request may indicate to upload a particular data item, such as, for example, one or more files. The request may specify to upload the data item to a particular memory location or to a particular location in a file system. In an example scenario, the request may be to upload data to a storage service such as Amazon S3. It will be appreciated, that the data requested to be uploaded may be any that is suitable and be formatted in any suitable manner. For example, the data may be a single file or multiple files and may contain any type of data including, for example, application data, content, etc.

Master server 116a may determine that the best manner for processing the request is to divide the processing amongst several separate processes or threads. For example, where the request is to upload data, the amount of data may be of such a significant size that master server 116a determines dividing the processing will enhance performance. Accordingly, at block 212, master server 116a divides the processing into parts. In the example scenario wherein the received request is to upload a data item, master server 116a may divide the data item into parts. The data may be divided into, for example, equal parts. In the particular scenario wherein the request is to upload a large data file, master server 116a may divide the data file into four equal parts, for example.

At block 214, master server 116a initiates separate processes or threads to perform the divided processing portions. In the example scenario where received request is to upload a data item and that item has been divided into data parts, master server 116a initiates or starts a separate process to upload each of the data parts. For example, where the received data item was divided by master server 116a into four parts, master server 116a may initiate four processes with each process responsible for uploading a different one of the four parts.

When master server 116a initiates the plurality of processes or threads, it also records information for each process. For example, master server 116a records for each process a time at which the particular process or thread was started. In the example scenario wherein master server 116a divided a received file into four parts and generated a process to upload each part, master server 116a records a start time for each process.

At block 216, master server 116a monitors and collects data regarding the initiated processes or threads. Master server 116a may monitor and identify when processes complete their processing. For example, as the processes complete performing their processing, e.g., complete uploading the data part, master server 116a records for each completing process the time of completion. In the example scenario wherein master sever 116a divided the data item into four parts, and three processes have completed processing, master server 116a records a completion time for each of the three completed processes.

For each completed process, master server 116a uses the start time or time of initiation of the process and the time of the completion of the process to calculate and record a duration or time that it took the particular process to complete its processing. More particularly, master server 116a records a difference between the start time and completion time for each process. In the example embodiment wherein the processes are devoted to uploading a particular data part, master server 116a records the time duration each completed process took to upload its particular data item part. In the scenario wherein master server 116a divided the data item into four parts and three processes have completed processing, master server 116a calculates a time duration for each process by calculating a difference between the start time and the completion time.

As part of monitoring, master server 116a maintains an average time duration for completion of the processes. In other words, master server 116a maintains a running average for how long it has taken for the initiated processes to complete their processing. As the master server-initiated processes complete processing, master server 116a calculates the duration of the processing and updates the average duration to reflect the recently completed process. In the example scenario wherein three of four process devoted to uploading data parts have completed processing, master server 116a calculates an average time duration based upon the durations of the three completed processes.

At block 218, master server 116a compares a value representing the number of or percentage of processes that have completed (or alternatively the number of or percentage of processes that have not completed processing) to a preliminary or first threshold. The preliminary or first threshold is a configurable value that defines a target portion of the executing processes that have completed processing. For example, the preliminary threshold may be defined as value representing half, i.e. 50 percent, of the processes that were initiated as part of the processing. In an alternative scenario, the preliminary threshold may be defined as a value representing sixty, i.e., 60, percent of the processes that were initiated. At block 218, master server 116a compares the number of completed processes or a number representing a percentage of all processes that have completed processing to the threshold to determine whether or not the preliminary or first threshold has been met. In the example scenario wherein the preliminary threshold has been set to fifty percent and two of an original four processes have completed uploading, at block 218, master server 116a may determine that the threshold has been met. In another example scenario, wherein the preliminary threshold has been set to seventy percent and three of an original four processes have completed uploading, at block 218, master server 116a may determine that the threshold has been met.

In an alternative example embodiment, the preliminary threshold may be set to a number of processes that have not yet completed processing. In an example scenario, the preliminary threshold may be set to a value indicating one process that has not yet completed processing. In such a scenario, master server 116a may determine that a particular process is the last process of those that were initiated that is continuing to perform the requested processing. In other words, master server 116a identifies the one process that is holding up completion of the processing of the original requested upload. In an example scenario wherein master server 116a initiated four processes to upload four different data item parts, master server 116a may determine that three of the four processes have completed and one process is continuing to attempt to upload a data item.

Master server 116a calculates a processing duration for each of the still-processing processes by calculating the difference between the current time and the recorded time that the each of the particular processes was initiated.

Where the preliminary threshold has not been satisfied, processing continues at block 218. Where the preliminary or first threshold has been met, processing continues at block 220.

At block 220, master server 116a compares the calculated processing duration for each of the still-processing, i.e., those processes that are not completed processing, to a second threshold that is calculated and maintained by master server 116a. In an example embodiment, the second threshold is configurable and may vary depending upon the number or percentage of processes that have completed processing. More particularly, in an example embodiment, the second threshold is a multiple of the average completion time of the completed processes, where the multiple varies depending upon the number of or percentage of the completed processes. Generally, the multiple that is employed, and therefore the second threshold that is calculated using the multiple, decreases as the number of completed processes increases. In an example scenario, where fifty percent of the original processes have completed processing, the multiple may be 1.5 and the threshold may be set as 1.5 times the average completion time. In the example scenario wherein four processes were initiated to upload four data item parts, and two of the four processes have completed processing, master server 116a determines the second threshold is equal to 1.5 times the average processing time of the two processes that have completed processing.

As the number of completed original processes increases, the multiple decreases. Accordingly, in an example scenario, where sixty percent of the original processes have completed processing (and 40 percent have not completed processing), the multiple may be 1.4 and the threshold is set as 1.4 times the average completion time of the completed processes. Where seventy percent of the original processes have completed processing (and 30 percent have not completed processing), the multiple may be 1.3 and the threshold is set as 1.3 times the average completion time of the completed processes. Where eighty percent of the original processes have completed processing (and 20 percent have not completed processing), the multiple may be 1.2 and the threshold is set as 1.2 times the average completion time of the completed processes. Where ninety percent of the original processes have completed processing (and 10 percent have not completed processing), the multiple may be 1.1 and the threshold is set as 1.1 times the average completion time of the completed processes.

In the example scenario wherein four processes were initiated to upload four data item parts, and three of the four processes have completed processing, master server 116a compares the processing duration for the still-executing process fourth process with a second threshold which is a function of the average processing duration calculated from the three completed processes.

For each of the still-processing processes that has a processing duration that exceeds the second threshold, at block 222, master server 116a initiates a new process to perform the same processing that the particular process was originally invoked to perform. In the example scenario wherein the original process was initiated to upload a particular data item part, the newly initiated process is likewise initiated to upload the same data item part. More particularly, in the scenario wherein one of four processes devoted to uploading four different data parts is still processing one of the four data parts, master server 116a initiates a new process to upload the same data part as that being processed by the still running process. Likewise, in the scenario wherein two of four processes, each created to upload different parts of four created data parts, are still processing, master server 116a initiates two new processes, one for each of the two original processes.

At block 224, master server 116a continues to monitor the status of any still-running processes that exceeded the threshold and the status of the corresponding newly initiated processes.

At block 226, master server 116a determines whether or not any of the newly initiated processes or the still-running original processes have completed processing. For example, master server 116a may determine that a process that was initiated at block 222 has completed processing. In another scenario, master server 116a may determine that the original process has completed processing. In the example scenario wherein master server 116a generated a new process to upload a last data item part that is also being uploaded by an original process, master server 116a determines either the new process or the still processing original process has completed uploading the particular data item part.

If at block 226, master server 116a determined that a process had completed processing, at block 228, master server 116a terminates the corresponding process(es) that remains processing. For example, in the scenario where a newly initiated process has completed processing, master server 116a terminates the original process. Where there may have been multiple processes initiated for the particular original process, each of those initiated processes are also terminated. In the scenario wherein the original process completes processing, master server 116a terminates the newly initiated process(es) that were initiated to perform the function of the original process. As shown in FIG. 2, after master server 116a terminates any processes corresponding to a completed process, master server 116a continues monitoring 224 relating to any still-running processes. It will be appreciated that when processing for a particular data item is complete, such as, for example, when uploading of a data item has been completed successfully either by the original process or a newly initiated process, the master server notifies any processing that may be dependent upon the completion of processing for the particular data item.

At block 230, master server 116a continues evaluating whether or not executing processes exceed the second threshold. This includes evaluating whether or not any processes created at block 222 exceed the second threshold. If not, processing continues at block 224. However, if the processing duration of any executing processes exceed the second threshold, master server 116a may consider initiating another process. In an example scenario, the processes that were initiated at block 222 may themselves continue processing for a duration that exceeds the second threshold, in which instance, master server 116a may consider initiating or spawning yet another process directed to performing the same task.

Master server 116a may enforce a limit on the number of separate processes that are initiated for any one original process. For example, master server 116a may limit the processes initiated to upload a particular data item to five (5) processes. Accordingly, at block 232, master server 116a determines whether creating a new process would exceed the limit for new processes. For example, if five processes for performing a particular function such as uploading a particular data part have already been initiated, master server 116a may determine that the limit has been exceeded and continue processing at block 234 where a communication is generated notifying the appropriate personnel. However, if at block 232, master server 116a determines a limit has not been reached, processing continues at block 222 where a new process may be initiated. Thereafter, processing continues as described above beginning with block 224.

The master server performs any processing attendant to fulfilling the original request. For example, the master server may communicate an acknowledgement that the requested service has been completed. In the example scenario wherein the original request was to upload a data item, the master server may communicate an indication that the data item has been uploaded to the desired service or location.

Figure 3:
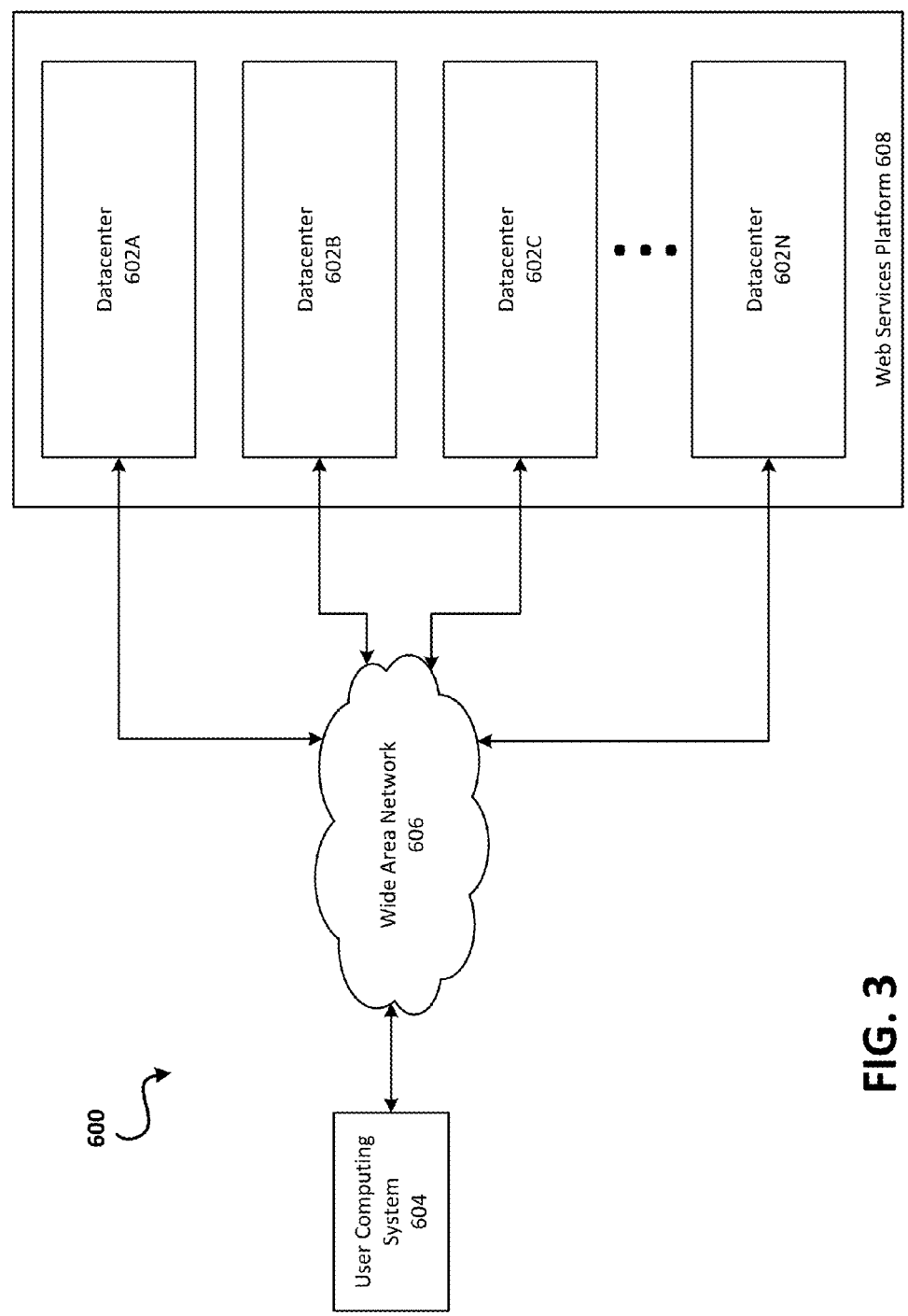
FIG. 3 depicts an example web services platform comprising a plurality of data centers that may be used in some embodiments.
Figure 4:
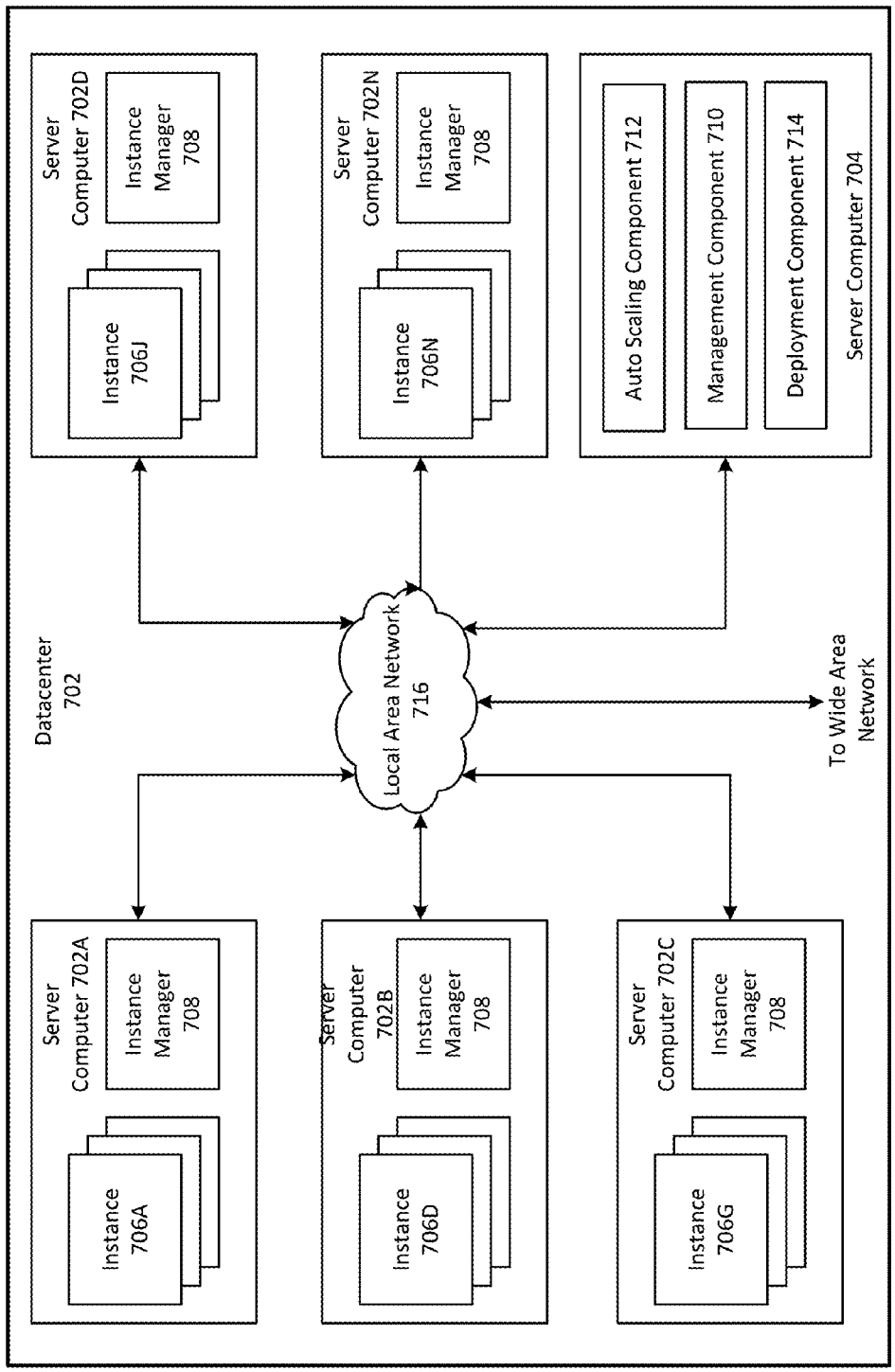
FIG. 4 depicts an example data center that may be used in some embodiments.
Figure 5:
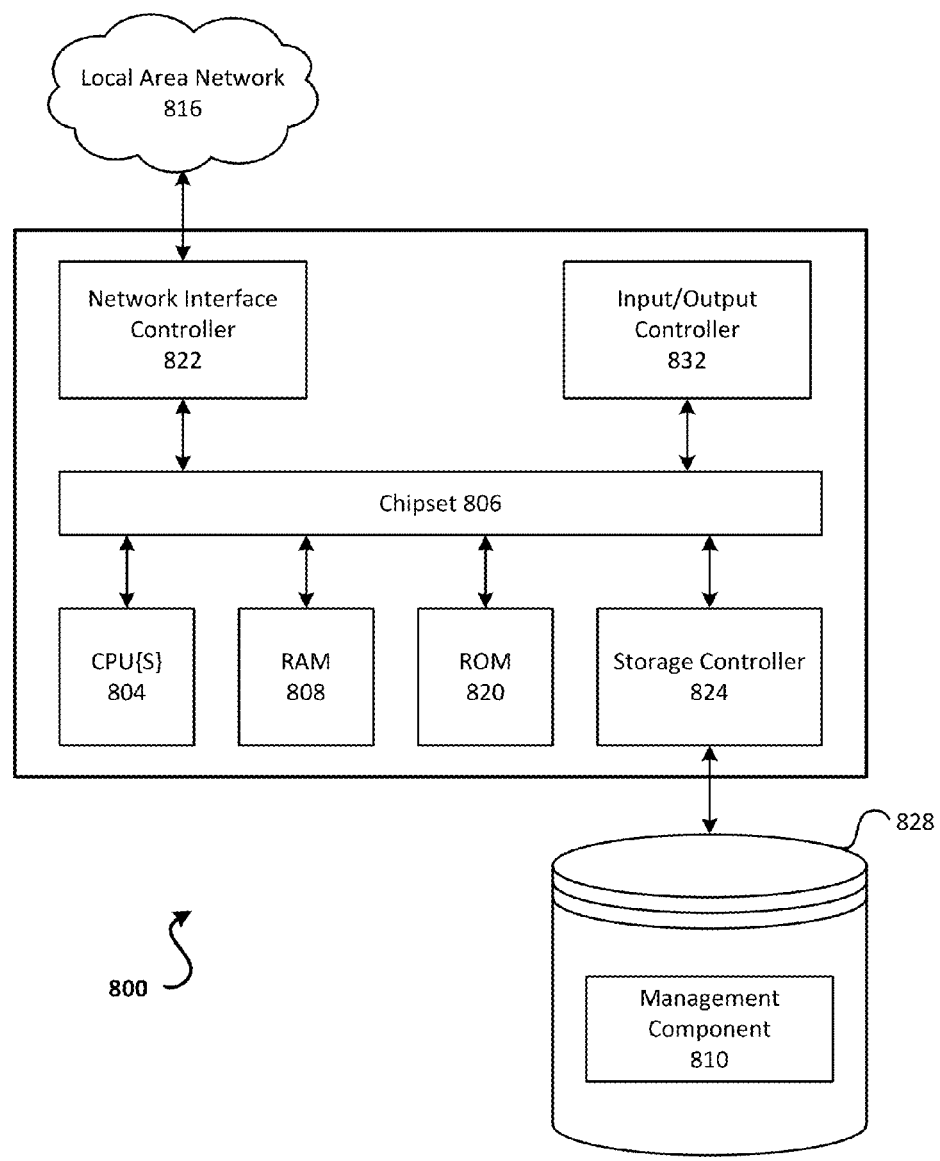
FIG. 5 depicts an example computing system that may be used in some embodiments.

FIGS. 3-5 are similar to FIG. 1 in that they depict example operating environments in which embodiments disclosed herein may be implemented. The figures depict these operating environments at varying levels of granularity. FIG. 3 generally depicts a web services platform that comprises a plurality of datacenters. FIG. 4 generally depicts a datacenter that comprises a plurality of computers. FIG. 5 generally depicts a computer that may be part of a datacenter.

It may be appreciated that the operating environments of FIGS. 3-5 may be used to implement aspects of the operating environment of FIG. 1 including the functionality described in connection with FIG. 2. For example, data center 110 may be implemented in one of, or across multiple datacenters 602A, 602B, 602C, and/or 602N of FIG. 3. Likewise, computers 102a and 102b may each be an instance of user computing system 604 of FIG. 3.

Turning now to details of FIG. 3, this figure depicts an example of a suitable computing environment in which embodiments described herein may be implemented. A cloud service provider (such as web services platform 608) may configure the illustrated computing environment to host virtual clouds of entities and to enable communication paths between these virtual clouds that may otherwise be isolated. In particular, FIG. 3 is a system and network diagram that shows an illustrative operating environment 600 that includes a web services platform 608 for implementing virtual clouds and for providing on-demand access to computer resources, such as virtual machine instances. Web services platform 608 can provide computer resources for executing applications on a permanent or an as-needed basis and may be configured as a private network. These computer resources may include various types of resources, such as data processing resources, data storage resources, data communication resources, and the like. Each type of computer resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like. In an example embodiment, data storage resources may be a Web service storage solution such as, for example, Amazon S3. Each type or configuration of computer resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The computer resources provided by web services platform 608 may be enabled by one or more datacenters 602A-602N, which may be referred herein singularly as "datacenter 602" or in the plural as "datacenters 602." Datacenters 602 may be facilities that house and operate computer systems and associated components and may include redundant and backup power, communications, cooling, and security systems. Datacenters 602 may be located in a same geographical area, such as in a same facility, and may be interconnected using private networks, such as high-speed fiber optic networks, controlled and managed by a service provider of web services platform 608. Datacenters 602 may also be distributed across geographically disparate locations and may be interconnected in part using public networks, such as the Internet. One illustrative configuration for datacenter 602 that implements the concepts and technologies disclosed herein is described below with regard to FIG. 4.

Entities of web services platform 608 may access the computer resources provided by datacenters 602 over a Wide Area Network (WAN) 606. Although a WAN is illustrated in FIG. 3, it should be appreciated that a Local Area Network (LAN), the Internet, or any other networking topology known in the art that connects datacenters 602 to remote entities and other users may be utilized. It should also be appreciated that combinations of such networks may also be utilized.

An entity or other entities that are users of web services platform 608 may utilize a computing system 604 to access the computer resources provided by datacenters 602. User computing system 604 comprises a computer capable of accessing web services platform 608, such as a server computer, a desktop or laptop personal computer, a tablet computer, a wireless telephone, a PDA, an e-reader, a game console, a set-top box, or any other computing node.

As is described in greater detail below, user computing system 604 may be utilized to configure aspects of the computer resources provided by web services platform 608. In this regard, web services platform 608 may provide a web interface through which aspects of its operation may be configured through the use of a web browser application program executing on user computing system 604. Alternatively, a stand-alone application program executing on user computing system 604 may access an application programming interface (API) exposed by web services platform 608 for performing the configuration operations. Other mechanisms for configuring the operation of web services platform 608, including launching new virtual machine instances on web services platform 608, may also be utilized.

According to embodiments disclosed herein, capacities of purchased computer resources provided by web services platform 608 can be scaled in response to demand. In this regard, scaling refers to the process of instantiating, which may also be referred to herein as "launching" or "creating," or terminating, which may also be referred to herein as "de-scaling," instances of computer resources in response to demand.

Web services platform 608 may also be configured with a deployment component to assist entities in the deployment of new instances of computer resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of computer resources.

FIG. 4 depicts a computing system diagram that illustrates one configuration for datacenter 602 that implements web services platform 608. With regards to elements of the web services platform 150 previously described with respect to FIG. 1, server computers 116 may be a server computer 702 of FIG. 4 (which itself may be computer 800 of FIG. 5), manager 120a,b may be an instance of instance manager 708, and VM instances 118a and 118b may each be an instance 706 of FIG. 4.

The example datacenter 602 shown in FIG. 3 may include several server computers 702A-702N, which may be referred herein singularly as "server computer 702" or in the plural as "server computers 702," for providing computer resources for hosting virtual clouds and for executing applications. Server computers 702 may be standard tower or rack-mount server computers configured appropriately for providing the computer resources described above. For instance, in one implementation server computers 702 may be configured to provide instances 706A-706N of computer resources.

Instances 706A-706N, which may be referred herein singularly as "instance 706" or in the plural as "instances 706," may be virtual machine instances. As known in the art, a virtual machine instance is an instance of a software implementation of a machine (i.e., a computer) that executes programs like a physical machine. In the example of virtual machine instances, each server 702 may be configured to execute an instance manager 708 capable of executing the instances. Instance manager 708 may be a hypervisor or another type of program configured to enable the execution of multiple instances 706 on a single server 702, for example. As discussed above, each of instances 706 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 602 shown in FIG. 4 may also include a server computer 704 reserved for executing software components for managing the operation of datacenter 602, server computers 702, and instances 706. In particular, server computer 704 may execute a management component 710. As discussed above, working between FIGS. 3 and 4, an entity of web services platform 608 may utilize user computing system 604 to access management component 710 to configure various aspects of the operation of web services platform 608 and instances 706 purchased by the entity. For example, the entity may purchase instances and make changes to the configuration of the instances. The entity may also specify settings regarding how the purchased instances are to be scaled in response to demand. The entity may also provide requests to launch instances to management component 710.

As also described briefly above, an auto scaling component 712 may scale instances 706 based upon rules defined by an entity of web services platform 608. For example, auto scaling component 712 may allow an entity to specify scale up rules for use in determining when new instances should be instantiated and scale down rules for use in determining when existing instances should be terminated.

As discussed briefly above, datacenter 602 may also be configured with a deployment component 714 to assist entities in the deployment of new instances 706 of computer resources. Deployment component 714 may receive a configuration from an entity that includes data describing how new instances 706 should be configured. For example, the configuration may specify one or more applications that should be installed in new instances 706, provide scripts and/or other types of code to be executed for configuring new instances 706, provide cache warming logic specifying how an application cache should be prepared, and other types of information.

Deployment component 714 may utilize the entity-provided configuration and cache warming logic to configure, prime, and launch new instances 706. The configuration, cache warming logic, and other information may be specified by an entity using management component 710 or by providing this information directly to deployment component 714. Other mechanisms may also be utilized to configure the operation of deployment component 714.

In the example datacenter 602 shown in FIG. 4, an appropriate LAN 716 may be utilized to interconnect server computers 702A-702N and server computer 704. LAN 716 may also be connected to WAN 606 illustrated in FIG. 3. It should be appreciated that the network topology illustrated in FIGS. 3 and 4 has been greatly simplified and that many more networks and networking devices may be utilized to interconnect the various computing systems disclosed herein. Appropriate load balancing devices or software modules may also be utilized for balancing a load between each of datacenters 602A-602N, between each of server computers 702A-702N in each datacenter 602 and between instances 706 purchased by each entity of web services platform 608. These network topologies and devices should be apparent to those skilled in the art.

It should be appreciated that datacenter 602 described in FIG. 4 is merely illustrative and that other implementations may be utilized. In particular, functionality described herein as being performed by management component 710, auto scaling component 712, and deployment component 714 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

FIG. 5 depicts an example computer architecture for a computer 800 capable of executing the above-described software components. With regard to the example web services platform 150 described with respect to FIG. 1, host computer 110, as well as computers 102A, 102B, and 102C, may each be implemented in computer 800 of FIG. 5.

The computer architecture shown in FIG. 5 illustrates a conventional server computer, workstation, desktop computer, laptop, tablet, network appliance, PDA, e-reader, digital cellular phone, or other computing node, and may be utilized to execute any aspects of the software components presented herein described as executing within datacenters 602A-602N, on server computers 702A-702N, on the user computing system 604, or on any other computing system mentioned herein.

Computer 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. CPUs 804 may be standard programmable processors that perform arithmetic and logical operations necessary for the operation of computer 800.

CPUs 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 806 may provide an interface between CPUs 804 and the remainder of the components and devices on the baseboard. Chipset 806 may provide an interface to a random access memory (RAM) 808 used as the main memory in computer 800. Chipset 806 may further provide an interface to a computer-readable storage medium, such as a read-only memory (ROM) 820 or non-volatile RAM (NVRAM) (not shown), for storing basic routines that may help to start up computer 800 and to transfer information between the various components and devices. ROM 820 or NVRAM may also store other software components necessary for the operation of computer 800 in accordance with the embodiments described herein.

Computer 800 may operate in a networked environment using logical connections to remote computing nodes and computer systems through LAN 816. Chipset 806 may include functionality for providing network connectivity through a network interface controller (NIC) 822, such as a gigabit Ethernet adapter. NIC 822 may be capable of connecting the computer 800 to other computing nodes over LAN 816. It should be appreciated that multiple NICs 822 may be present in computer 800, connecting the computer to other types of networks and remote computer systems.

Computer 800 may be connected to a mass storage device 828 that provides non-volatile storage for the computer. Mass storage device 828 may store system programs, application programs, other program modules, and data, which have been described in greater detail herein. Mass storage device 828 may be connected to computer 800 through a storage controller 824 connected to chipset 806. Mass storage device 828 may consist of one or more physical storage units. Storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 800 may store data on mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 828 is characterized as primary or secondary storage and the like.

For example, computer 800 may store information to mass storage device 828 by issuing instructions through storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 800 may further read information from mass storage device 828 by detecting the physical states or characteristics of one or more particular locations within the physical storage units.

In addition to mass storage device 828 described above, computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 800.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 828 may store an operating system utilized to control the operation of the computer 800. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 828 may store other system or application programs and data utilized by computer 800, such as management component 810 and/or the other software components described above.

Mass storage device 828 or other computer-readable storage media may also be encoded with computer-executable instructions, which, when loaded into computer 800, transforms the computer from a general-purpose computing system into a special-purpose computer capable of implementing the embodiments described herein. These computer-executable instructions transform computer 800 by specifying how CPUs 804 transition between states, as described above. Computer 800 may have access to computer-readable storage media storing computer-executable instructions, which, when executed by computer 800, may perform operating procedures depicted in FIG. 2.

Computer 800 may also include an input/output controller 832 for receiving and processing input from a number of input devices, such as a keyboard, a mouse, a touchpad, a touch screen, an electronic stylus, or other type of input device. Similarly, input/output controller 832 may provide output to a display, such as a computer monitor, a flat-panel display, a digital projector, a printer, a plotter, or other type of output device. It will be appreciated that computer 800 may not include all of the components shown in FIG. 5, may include other components that are not explicitly shown in FIG. 5, or may utilize an architecture completely different than that shown in FIG. 5.

As described herein, a computing node may be a physical computing node, such as computer 800 of FIG. 5. A computing node may also be a virtual computing node, such as a virtual machine instance, or a session hosted by a physical computing node, where the computing node is configured to host one or more sessions concurrently.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Accordingly, applicant has disclosed systems, methods, and computer readable media that are adapted for processing long running processes. According to a first aspect of the disclosed embodiments, a request to upload data is received at a server. The server is adapted to divide the data into multiple parts and to launch a separate process to upload each of the divided parts. The server records for each process the processing time or duration that the particular process used to upload its corresponding data item. The server maintains an average processing duration that is calculated from the processing durations of the completed processes. The server identifies that one process is continuing to run and compares a processing duration for the process to a threshold derived from the average processing time. If the processing time for the particular process exceeds the threshold, the server initiates a new process to upload the same data item. When the server receives notice that one of the new process or the still running process has completed processing, the server terminates the other process.

It will be appreciated that while illustrative embodiments have been disclosed, the scope of potential embodiments is not limited to those explicitly described. For example, while the concepts are described with reference to the particular example processing of uploading data, the envisioned embodiments extend to processing of any requested job that may is suitable for division into parts and processing by individual processes or threads.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method, comprising:
receiving a request to upload a data item;
dividing the data item into a plurality of data parts, each of the data parts representing part of the data item;
initiating a plurality of processes, each of the plurality of processes performing processing to upload a respective one of the plurality of data parts;
recording a processing duration for each process of the plurality of processes that completes processing to upload its respective data part representing part of the data item;
determining at least one of the plurality of processes continues processing to upload its respective data part representing part of the data item;
for each of the at least one of the plurality of processes continuing processing to upload its respective data part representing part of the data item, comparing a processing duration to a threshold derived from an average processing duration for processes that have completed processing to upload their respective data parts representing parts of the data item; and
for each of the at least one of the plurality of processes continuing processing to upload its respective data part representing part of the data item, initiating a new process to upload the respective data part upon determining the processing duration exceeds the threshold.

2. The method of claim 1, further comprising:
for each new process initiated to upload the data part upon determining the processing duration exceeds the threshold:
determining the new process or the one of the plurality of processes continuing processing to upload the respective data part has completed processing to upload the respective data part; and
terminating processing of the new process or the one of the plurality of processes continuing processing to upload the respective data part.

3. The method of claim 1, wherein dividing the data item into a plurality of data parts comprises dividing the data item into equal data parts.

4. The method of claim 1, wherein recording a processing duration for each process of the plurality of processes that completes processing to upload a data part representing part of the data item, comprises:
recording, for each process, a start time identifying when processing started;
recording, for each process, a completion time identifying when processing completed; and
calculating, for each process, a difference between the completion time and the start time.

5. A computing system for uploading data, comprising:
computing memory having stored therein computer instructions that, upon execution by one or more processors, at least cause the system to perform operations comprising:
initiating a plurality of processes, each of the plurality of processes performing processing to upload a respective data item, each respective data item representing part of a whole data item;
recording a processing duration for each process of the plurality of processes that finishes uploading its respective data item representing part of the whole data item;
determining a process of the plurality of processes is continuing to upload its respective data item representing part of the whole data item;

comparing a processing duration of the process continuing to upload its respective data item representing part of the whole data item to a duration threshold derived from processing durations recorded for processes that have finished uploading their respective data item representing part of the whole data item; and based upon determining the process duration of the process continuing to upload its respective data item representing part of the whole data item exceeds the duration threshold derived from the process durations recorded for processes that have finished uploading their respective data item representing part of the whole data item, initiating a new process to upload the respective data item of the process continuing to upload.

6. The system of claim 5, the operations further comprising:

receiving a request to upload the whole data item; and
dividing the whole data item into the data items.

7. The system of claim 6, wherein the data items are of equal size.

8. The system of claim 6, wherein recording an uploading duration for each process that finishes uploading its respective data item representing part of the whole data item, comprises:

recording, for each process, a start time identifying when uploading started;
recording, for each process, a completion time identifying when uploading finished; and
calculating, for each process, a difference between the completion time and the start time.

9. The system of claim 6, wherein receiving a request to upload the whole data item comprises receiving a request to upload the whole data item via a web service.

10. The system of claim 5, the operations further comprising:

calculating an average computing duration reflecting computing durations for each process that finishes uploading its respective data item, and wherein the duration threshold is derived from the average computing duration.

11. The system of claim 10, wherein the duration threshold is the average computing duration, 1.1 times the average computing duration, 1.2 times the average computing duration, 1.3 times the average computing duration, 1.4 times the average computing duration, or 1.5 times the average computing duration.

12. The system of claim 5, wherein determining the process of the plurality of processes continuing to upload its respective data item comprises determining that a number of the plurality of processes that have finished uploading exceeds a preliminary threshold.

13. The system of claim 5, the operations further comprising:

determining that one of the new process and the process continuing to upload the respective data item has finished uploading the respective data item; and
terminating uploading of the other one of the new process and the process continuing to upload the respective data item.

14. The system of claim 5, wherein the duration threshold is derived by multiplying an average computing duration by a multiple that varies depending upon the number of processes that have finished uploading their respective data items representing part of the whole data item.

15. A non-transitory computer-readable storage medium having stored thereon computer instructions that, upon execution by one or more processors, at least cause a computing system to perform operations comprising:

dividing a data item into at least a first data part corresponding to part of the data item, a second data part corresponding to part of the data item, and a third data part corresponding to part of the data item;
initiating a first process to upload the first data part, a second process to upload the second data part, and a third process to upload the third data part;
upon the first process completing uploading the first data part, recording a first duration associated with uploading the first data part;
upon the second process completing uploading the second data part, recording a second duration associated with uploading the second data part;
determining a processing duration of the third process exceeds a duration threshold formed using at least the first duration and the second duration; and
based upon determining the process duration of the third process exceeds the duration threshold formed using at least the first duration and the second duration, initiating a new process to upload the third data part.

16. The non-transitory computer-readable storage medium of claim 15, wherein the duration threshold is derived from an average duration formed from at least the first duration and the second duration.

17. The non-transitory computer-readable storage medium of claim 15, wherein dividing data into at least a first data part, a second data part, and a third data part comprises dividing data into equal or substantially equal parts.

18. The non-transitory computer-readable storage medium of claim 15, the operations further comprising:

determining one of the new process and the third process has completed uploading the third data part; and
terminating processing of one of the new process and the third process.

19. The non-transitory computer-readable storage medium of claim 18, the operations further comprising:

receiving a request to upload the data;
upon determining one of the new process and the third process has completed processing to upload the third data part, communicating the data has been uploaded.

20. The non-transitory computer-readable storage medium of claim 19, wherein receiving a request to upload the data comprises receiving a request to upload a data item via a web service.

* * * * *